United States Patent Office 3,541,178
Patented Nov. 17, 1970

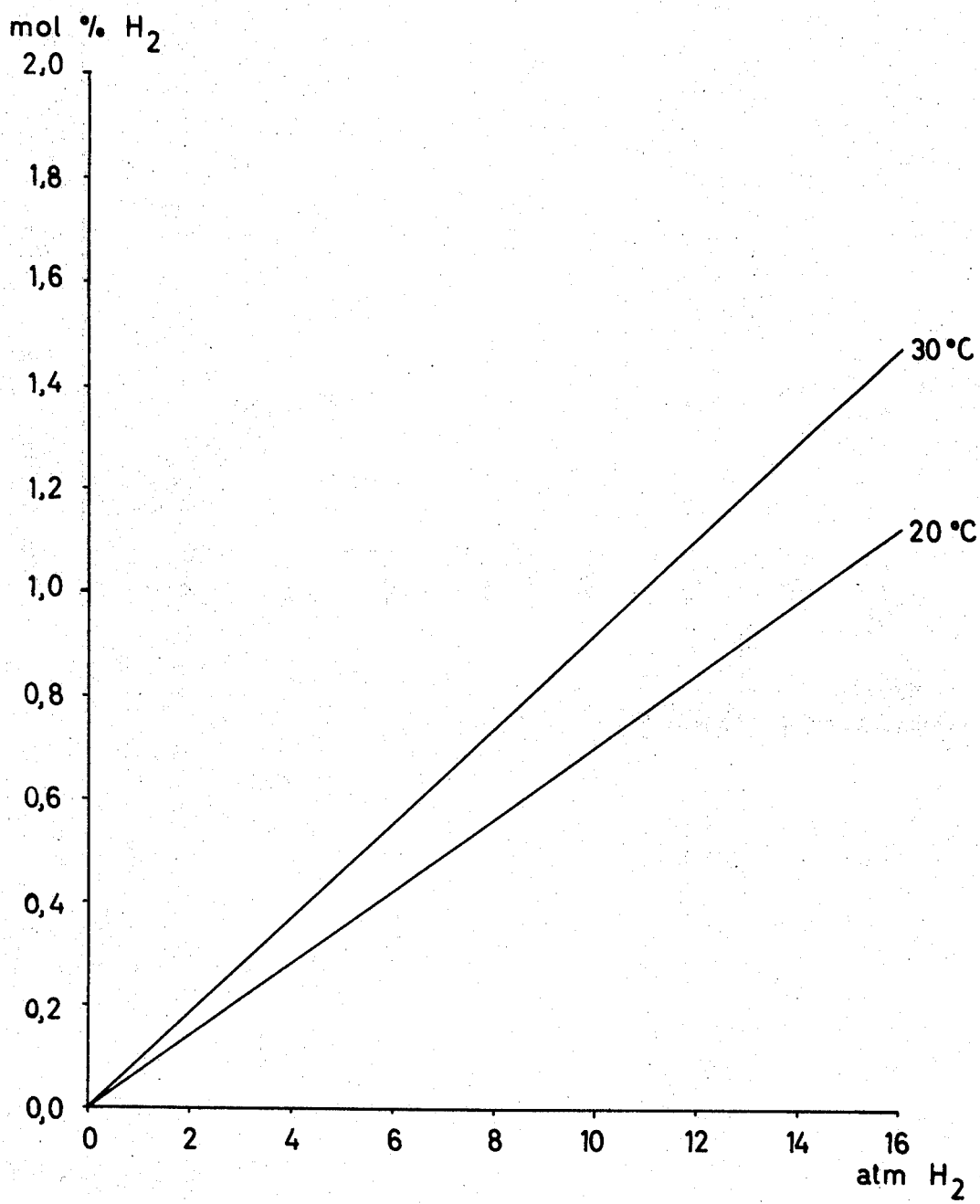

3,541,178
PROCESS FOR REMOVING ACETYLENES FROM MIXTURES OF HYDROCARBONS
Gottfried Nettesheim, Wesseling, near Cologne, Germany, assignor to Union Rheinische Braunkohlen Kraftstoff Aktiengesellschaft, Wesseling, near Cologne, Germany, a corporation of Germany
Filed May 28, 1968, Ser. No. 732,706
Claims priority, application Germany, June 2, 1967, U 3,941; Nov. 16, 1967, U 14,411
Int. Cl. C07c 5/02, 7/00; C10g 23/02
U.S. Cl. 260—681.5                                    3 Claims

ABSTRACT OF THE DISCLOSURE

Selectively removing acetylenes from hydrocarbon mixtures containing diolefins by liquid phase hydrogenation whereby the hydrocarbon mixtures are prevented from being saturated with hydrogen throughout the entire reaction.

FIELD OF INVENTION

This invention relates to a process for removing acetylenes from olefins containing mixtures of hydrocarbons having 4 or 5 carbon atoms.

DESCRIPTION OF PRIOR ART

The mixtures of hydrocarbons having 4 or 5 atoms, that are formed, for example, in the pyrolysis of hydrocarbons, contain small quantities of acetylenes which usually interfere with the further processing of the mixtures and which therefore have to be removed as completely as possible.

It is known that the acetylenes can be removed by catalytic hydrogenation either in the gas phase or in the liquid phase. In order to minimise the amount of desirable unsaturated compounds which are hydrogenated at the same time as the acetylenes, and which are therefore lost, it has already been proposed to separate a fraction of particularly high acetylene content from the hydrocarbon mixture to be treated, to restrict hydrogenation to this fraction only, and then to return it to the main stream. Hydrogenation carried out in the liquid phase, on the so-called trickle principle, also involves considerable losses, for example, of 1,3-butadiene in $C_4$-hydrocarbon mixtures, with the result that it has been proposed to pass the liquid hydrocarbon mixtures, saturated with hydrogen, over a catalyst in an upwardly directed stream. Until now it was deemed necessary to have hydrogen present sufficiently at each moment of the reaction even if the hydrogenation would be more extensive than necessary. Otherwise it was expected that the unsaturated hydrocarbons would polymerise and then damage the catalyst and disturb the process.

SUMMARY OF THE INVENTION

It has now been found that the losses of desirable, olefinically-unsaturated hydrocarbons can be kept particularly low if in the process for removing acetylenes from mixtures of hydrocarbons having 4 or 5 carbon atoms by catalytic hydrogenation in the liquid phase the hydrogen required to hydrogenate the acetylenes is added to the hydrocarbon mixture to be treated in such a way that the hydrocarbon mixture is prevented from being saturated with hydrogen throughout the entire reaction. The process may be carried out under otherwise conventional reaction conditions.

DETAILED DESCRIPTION OF INVENTION

In the continuous hydrogenation of the acetylenes according to the invention the hydrogen should be introduced into the reactor metered in such a manner that no more than about 80 to 90% of hydrogen is present at the point of introduction related to the maximum solubility of hydrogen in the hydrocarbon mixture to be treated under the reaction conditions selected. In the attached figure there are shown two curves for the maximum solubility of hydrogen in mol precent in a hydrocarbon mixture at 20 and 30° C. depending on the reaction pressure. The compositions of the hydrocarbon mixture for which the curves are valid is

|  | Percent by weight |
|---|---|
| Butenine | 0.44 |
| Butine-1 | 0.12 |
| Butadiene-1,2 | 0.13 |
| Butadiene-1,3 | 41.42 |
| Butene-1 | 38.64 |
| Trans-butene-2 | 3.48 |
| Cis-butene-2 | 4.39 |
| Isobutane | 2.61 |
| n-Butane | 8.77 |

The vapor pressures at 20° C. and 30° C. are 2.7 and 3.7 atm., resp.

Such data must be determined in known manner for other mixtures at the desired reaction conditions if necessary. They give the amount of hydrogen which corresponds to a partial saturation of about 80 to 90% in the hydrocarbon mixture to be hydrogenated. This amount is metered and introduced into the mixture either in total at the beginning or in parts at several points in the course of the reaction but in any case not exceeding the said 90% of hydrogen saturation. If the hyrodgen needed is introduced in such a manner practically all hydrogen will be consumed at the end of the reaction leaving the hydrocarbon mixture free of dissolved hydrogen. Therefore the process according to the invention demonstrates not only a diminition of the amount of hydrogen dissolved in the hydrocarbons to spare the less susceptible diolefins but a consumption of the hydrogen to such an extent that no hydrogen at all is dissolved in the hydrocarbon mixture at the end of the reaction. Surprisingly no polymerisation of acetylenes or diolefins occurs and the removal of the acetylenes is high, while the loss of diolefins is very low.

The metering of the amount of hydrogen to be introduced into the reactor can be conducted in known manner, e.g. by metering capillaries in combination with devices for metering the pressure difference. The measuring of the hydrogen content and the selection of the length of the catalyst zones by examining the hydrogen consumption can be done in known manner by analysing samples withdrawn from the reaction zones. The conventional catalysts, for example noble metals on supports of alumina, may be used. It has also proved to be of advantage to use a catalyst of noble metal on an alkaline earth metal carbonate to which a little lead has been added. The hydrocarbon mixture may be passed either upwards or downwards over the catalyst. The concentration of acetylenes and the concentration of desirable unsaturated compounds in the hydrocarbon mixtures may vary within wide limits. The hydrogen may be introduced and the reaction products worked up in any desired or convenient manner. When the acetylene content or the hydrocarbon mixtures is fairly low, it is sufficient to add the hydrogen to the starting material before the reaction. When the mixture contains fairly large quantities of acetylenes, some of the hydrogen is added before or at the beginning of the reaction and the remainder added to the reactor at 2 or more and preferably at 4 or more different points during the course of the reaction. The process is preferably carried out at a temperature up to about 40° C. and under a pressure up to about 20 atm.

Despite the relatively low hydrogen concentration in the reaction mixture, the selective hydrogenation of the acetylenes is adequate, the loss of butadiene being very low. Harmful polymers are not formed.

Example 1

6.4 litres per hour of liquid hydrocarbons were passed upwards at a pressure of approximately 7 atm. through a 20 mm. diameter reactor, cooled with water to 25° C. and filled with 150 ml. of catalyst in pellet form (0.5% by weight Pd on $CaCO_3$ to which a little lead has been added). 0.13 mol/hr. of hydrogen were added to the liquid reaction product in front of the reactor. Thus the hydrocarbons were saturated with $H_2$ only to about 54% because their saturation is obtained at the said temperature and under the said pressure by addition of about 0.36 mol percent of $H_2$. The partial pressure of the hydrogen was about 3.8 atm.

The analyses of the starting product and the reaction product were as follows:

|  | Hydrogenation, percent per weight | |
|---|---|---|
|  | Before | After |
| 1,3-butadiene | 43.0 | 42.85 |
| 1,2-butadiene | 0.09 | 0.09 |
| Butenine | [1] 160 | [1] 70 |
| 1-butine | [1] 220 | [1] 130 |
| 1-butene and isobutene | 39.2 | 39.3 |
| Trans-2-butene | 4.3 | 4.3 |
| Cis-2-butene | 3.8 | 3.8 |
| Isobutane | 2.5 | 2.5 |
| n-Butane | 7.1 | 7.1 |

[1] Parts per million.

This corresponds to a butadiene loss of 0.35%. When hydrogenation was carried out with a hydrogen-saturated hydrocarbon stream that is with addition of a little more than 0.25 mol/hr. of $H_2$ which corresponds to the saturation content of about 0.36 mol percent, but under otherwise the same conditions, the following picture emerged:

|  | Hydrogenation, percent per weight | |
|---|---|---|
|  | Before | After |
| 1,3-butadiene | 43.3 | 43.0 |
| 1,2-butadiene | 0.11 | 0.12 |
| Butenine | [1] 160 | [1] 80 |
| 1-butine | [1] 220 | [1] 130 |
| 1-butene and isobutene | 38.8 | 30.0 |
| Trans-2-butene | 4.4 | 4.5 |
| Cis-2-butene | 3.8 | 3.8 |
| Isobutane | 2.9 | 2.9 |
| n-Butane | 6.7 | 6.7 |

[1] Parts per million.

This corresponds to a loss of 0.7% butadiene. In corresponding tests with an isoprene containing hydrocarbon mixture the loss of isoprene with and without saturation of the hydrocarbon mixture with hydrogen was 1.1% and 0.7%. (by weight) resp.

Example 2

3.2 litres per hour of a liquid hydrocarbon mixture were passed upwards at a pressure of approximately 7 atm. through a 20 mm. diameter reactor, cooled to 20° C. and filled with catalyst pellets (0.5% by weight Pd on alumina). 0.9 mol/hr. corresponding to 2.5 mol percent of hydrogen were added to the mixture in front of the reactor.

The analyses of starting and reaction product were as follows:

|  | Hydrogenation, percent per weight | |
|---|---|---|
|  | Before | After |
| 1,3-butadiene | 43.5 | 41.6 |
| Butenine | 0.33 | [1] 100 |
| 1-butine | 0.08 | [1] 240 |
| 1,2-butadiene | 0.08 | 0.09 |
| 1-butene and isobutene | 39.4 | 40.7 |
| Trans-2-butene | 4.5 | 5.1 |
| Cis-2-butene | 3.6 | 3.8 |
| Isobutane | 2.4 | 2.6 |
| n-Butane | 6.1 | 6.1 |

[1] Parts per million.

The loss of 1,3-butadiene amounted to 4.4%.

If the catalyst is arranged in 8 zones, with inert distributors in between, and if the hydrogen required is introduced through metering capillaries combined with a device for metering the difference of pressures before the first zone and between the catalyst zones, under otherwise the same conditions as above, 0.6 mol of hydrogen only is required to obtain almost the same removal of acetylenes. This corresponds to about 1.7 mol percent of $H_2$. Therefore ⅛ of $H_2$ was introduced into each catalyst zone i.e. about 0.21 mol percent. The saturation of the hydrocarbon mixture under the said reaction conditions is obtained by addition of about 0.31 mol percent of $H_2$ (partial pressure of the hydrogen about 4.3 atm.). Thus a partial saturation of about 68% was at the beginning of each catalyst zone. Samples withdrawn at the end of each zone contained practically no hydrogen dissolved.

The analyses of the starting product and the reaction product were as follows:

|  | Hydrogenation, percent per weight | |
|---|---|---|
|  | Before | After |
| 1,3-butadiene | 39.2 | 38.4 |
| Butenine | 0.33 | [1] 92 |
| 1-butine | 0.09 | [1] 241 |
| 1,2-butadiene | 0.05 | 0.05 |
| 1-butene and isobutene | 39.6 | 40.3 |
| Trans-2-butene | 5.8 | 6.1 |
| Cis-2-butene | 4.0 | 4.1 |
| Isobutane | 2.9 | 2.9 |
| n-Butane | 8.1 | 8.1 |

[1] Parts per million.

The loss of 1,3-butadiene was 2.0%. Similar results are obtained by passing the hydrocarbon stream downwards over the catalyst.

Example 3

A catalyst based on 0.5% by weight of Pd on calcium carbonate, to which a small amount of lead had been added, was used. 0.5 mol/hr. of hydrogen corresponding to about 1.41 mol percent was introduced through 6 metering capillaries under otherwise the same conditions as in Example 2. Therefore about 0.24 mol percent of hydrogen was dissolved at the beginning of each catalyst zone. As an amount of about 0.31 mol percent of hydrogen dissolved corresponds to the saturation this was only about 77.5% in the present example. At the end of the zones practically no hydrogen was dissolved in the product. The following results were obtained:

|  | Hydrogenation, percent per weight | |
|---|---|---|
|  | Before | After |
| 1,3-butadiene | 43.8 | 43.2 |
| Butenine | 0.38 | [1] 113 |
| 1-butine | 0.10 | [1] 358 |
| 1,2-butadiene | 0.12 | 0.07 |
| 1-butene and isobutene | 39.0 | 39.6 |
| Trans-2-butene | 4.9 | 5.4 |
| Cis-2-butene | 4.4 | 4.4 |
| Isobutane | 2.1 | 2.1 |
| n-Butane | 5.2 | 5.2 |

[1] Parts per million.

The loss of 1,3-butadiene was 1.4%.

The following results were obtained with the hydrogen being introduced through 8 metering capillaries whereby at the beginning of each zone 0.18 mol percent of hydrogen was dissolved in the hydrocarbons.

|  | After hydrogenation |
|---|---|
| 1,3-butadiene _____percent by weight__ | 43.2 |
| Butenine _____p.p.m__ | 67 |
| 1-butine _____p.p.m__ | 236 |
| 1,2-butadiene _____percent by weight__ | 0.08 |
| 1-butene and isobutene _____do____ | 39.7 |
| Trans-2-butene _____do____ | 5.4 |
| Cis-2-butene _____do____ | 4.3 |
| Isobutane _____do____ | 2.1 |
| n-Butane _____do____ | 5.2 |

The butadiene loss was 1.4%.

I claim:

1. In the process for removing acetylenes from diolefins containing mixtures of hydrocarbons having 4 or 5 carbon atoms by continuous catalytic hydrogenation in the liquid phase at temperatures up to about 40° C. and under pressures up to about 20 atmospheres, the improvement comprising adding the hydrogen required to hydrogenate the acetylenes in the hydrocarbon mixture in such a way that the content of hydrogen solved in the hydrocarbon mixture at the point of the addition of hydrogen is no more than about 90% of the solubility of hydrogen in the hydrocarbon mixture at the reaction temperature and reaction pressure selected, and in such an amount depending on the content of acetylenes in the hydrocarbon mixture that the hydrogen added is practically completely consumed at the end of the reaction.

2. The process as claimed in claim 1, wherein a portion of the hydrogen is added before or at the beginning of the reaction and the remainder of the hydrogen is added to the reactor at four or more different points during the course of the reaction.

3. The process as claimed in claim 1, wherein the catalyst comprises a noble metal on an alumina support to which a small amount of lead has been added.

References Cited

UNITED STATES PATENTS

| 3,036,137 | 5/1962 | Challis et al. | 260—677 |
| 3,075,917 | 1/1963 | Kronig et al. | 208—255 |
| 3,342,891 | 9/1967 | Poons et al. | 260—681.5 |

DELBERT E. GANTZ, Primary Examiner

G. SCHMITKONS, Assistant Examiner

U.S. Cl. X.R.

208—143